US011076402B2

(12) United States Patent
Tang et al.

(10) Patent No.: US 11,076,402 B2
(45) Date of Patent: Jul. 27, 2021

(54) TRANSMISSION OF TIME UNIT PATTERN INFORMATION CORRESPONDING TO A SLOT SET

(71) Applicant: HUAWEI TECHNOLOGIES CO., LTD., Guangdong (CN)

(72) Inventors: Hao Tang, Shanghai (CN); Guohua Zhou, Shanghai (CN); Zhenfei Tang, Ottawa (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/460,070

(22) Filed: Jul. 2, 2019

(65) Prior Publication Data

US 2019/0327734 A1 Oct. 24, 2019

Related U.S. Application Data

(63) Continuation of application No. PCT/CN2018/071257, filed on Jan. 4, 2018.

(30) Foreign Application Priority Data

Jan. 5, 2017 (CN) .......................... 201710008421.2

(51) Int. Cl.
*H04W 72/04* (2009.01)
*H04W 56/00* (2009.01)
(Continued)

(52) U.S. Cl.
CPC ..... *H04W 72/0446* (2013.01); *H04W 56/001* (2013.01); *H04W 68/005* (2013.01); *H04W 74/0825* (2013.01)

(58) Field of Classification Search
CPC ........... H04W 72/0446; H04W 56/001; H04W 68/005; H04W 74/0825; H04W 72/042;
(Continued)

(56) References Cited

U.S. PATENT DOCUMENTS

| 6,035,333 A | 3/2000 | Jeffries et al. | |
| 2014/0003414 A1* | 1/2014 | Choudhury | ......... H04W 74/006 370/347 |
| 2019/0239229 A1* | 8/2019 | Lin | ...................... H04B 7/0626 |

FOREIGN PATENT DOCUMENTS

| CN | 1691545 A | 11/2005 |
| CN | 1878053 A | 12/2006 |

(Continued)

*Primary Examiner* — Ian N Moore
*Assistant Examiner* — Rushil Parimal Sampat
(74) *Attorney, Agent, or Firm* — Womble Bond Dickinson (US) LLP

(57) ABSTRACT

Embodiments of this application provide a data transmission method, an apparatus, and a system, and relate to the field of communications technologies, to resolve a problem that two carriers cannot be deployed overlapping with each other. The method includes: determining a transmission time unit pattern corresponding to a slot set, where the transmission time unit pattern is used to indicate a symbol location at which a transmission time unit in a slot in the slot set is located, and a quantity of symbols included in the transmission time unit is less than a quantity of symbols included in the slot; and sending a notification message to a terminal device, where the notification message includes information about the slot set and information about the transmission time unit pattern, and the information about the transmission time unit is used to indicate the transmission time unit pattern.

13 Claims, 7 Drawing Sheets

(51) Int. Cl.
*H04W 68/00* (2009.01)
*H04W 74/08* (2009.01)

(58) Field of Classification Search
CPC .... H04W 72/0493; H04L 5/14; H04L 5/0044; H04L 5/0048; H04L 5/0053
See application file for complete search history.

(56) References Cited

FOREIGN PATENT DOCUMENTS

| | | |
|---|---|---|
| CN | 102325377 A | 1/2012 |
| CN | 102484874 A | 5/2012 |
| CN | 103825691 A | 5/2014 |
| CN | 104995855 A | 10/2015 |
| KR | 20140127213 A | 11/2014 |
| WO | 2014113969 A1 | 7/2014 |

* cited by examiner

TRANSMISSION OF TIME UNIT PATTERN INFORMATION CORRESPONDING TO A SLOT SET

CROSS-REFERENCE TO RELATED APPLICATIONS

This application is a continuation of International Application No. PCT/CN2018/071257, filed on Jan. 4, 2018, which claims priority to Chinese Patent Application No. 201710008421.2, filed on Jan. 5, 2017. The disclosures of the aforementioned applications are hereby incorporated by reference in their entireties.

TECHNICAL FIELD

This application relates to the field of communications technologies, and in particular, to a data transmission method, an apparatus, and a system.

BACKGROUND

In the field of communications technologies, a carrier is usually deployed by using a frequency domain multiplexing (FDM) technology. Each carrier is used to transmit data of only one user, and to avoid mutual interference between data transmitted on a plurality of carriers, a guard interval needs to be set between the carriers. When a carrier is deployed by using the FDM technology, a bandwidth of a carrier is required to match a width of an available spectrum. However, the bandwidth of the carrier is usually fixed. For example, a bandwidth of a carrier in a Universal Mobile Telecommunications System (UMTS) is usually 5 M, and a bandwidth of a carrier in Long Term Evolution (LTE) is usually 1.4 M, 3 M, 5 M, 10 M, 15 M, or 20 M. Consequently, when the width of the available spectrum is irregular, spectrum resources are wasted in a carrier deployment process.

To resolve spectrum resource waste, a solution currently proposed is that two carriers are deployed overlapping with each other. To be specific, spectrums of the two carriers are allowed to overlap with each other, and processing is performed in an overlapping area of the two carriers. For example, in the overlapping area, different carriers are scheduled to different physical resource blocks (PRBs) in a conventional transmission resource scheduling manner, to flexibly transmit service data carried on each of the carriers, so that the two carriers can share a spectrum resource. Consequently, the carrier is flexibly deployed and spectrum resources are reduced.

However, not only service data carried on some carriers, but also some full-bandwidth physical channels and/or some physical signals transmitted at a fixed symbol (symbol) location on each PRB (a PRB is a slot in terms of time, and each slot includes six or seven symbols) need to be transmitted on the carriers. For example, on an LTE carrier, a cell-specific reference signal (CRS) is sent at a fixed symbol location on each PRB, and a physical downlink control channel (PDCCH) is sent at a fixed symbol location on a PRB of an even slot. If the LTE carrier and another carrier are deployed overlapping with each other, in the overlapping area, a transmission resource cannot be scheduled between the LTE carrier and the another carrier in the conventional transmission resource scheduling manner, and consequently the LTE carrier and the another carrier cannot be deployed overlapping with each other.

SUMMARY

This application provides a data transmission method, an apparatus, and a system, to resolve a problem that two carriers cannot be deployed overlapping with each other.

According to a first aspect, this application provides a data transmission method, and the method includes: determining a transmission time unit pattern corresponding to a slot set, where the transmission time unit pattern is used to indicate a symbol location at which a transmission time unit in a slot in the slot set is located, and a quantity of symbols included in the transmission time unit is less than a quantity of symbols included in the slot; and sending a notification message to a terminal device, where the notification message includes information about the slot set and information about the transmission time unit pattern, and the information about the transmission time unit is used to indicate the transmission time unit pattern.

According to the data transmission method provided in this application, a network side device can instruct, by using the determined transmission time unit pattern, the terminal to transmit data by using some symbols in each slot as a transmission time unit. In other words, the terminal device transmits data on some symbols in each slot instead of in the entire slot. In this case, the network side device may schedule a remaining symbol for another carrier for data transmission, so that a carrier used by the terminal and the another carrier can be deployed overlapping with each other.

In one embodiment, the determining a transmission time unit pattern corresponding to a slot set includes: determining, based on a symbol occupation status of a first carrier in the slot, the transmission time unit pattern corresponding to the slot set, where the first carrier is a carrier that is deployed overlapping with a carrier used by the terminal device.

In this embodiment, the network side device determines the transmission time unit pattern based on the symbol occupation status, in the slot, of the first carrier that is deployed overlapping with the carrier used by the terminal device, to avoid mutual interference between data transmitted by the terminal device and data transmitted on the first carrier.

In one embodiment, a quantity of transmission time unit patterns and a quantity of slot sets are both N, N≥1, N is an integer, and the notification message includes information about the N slot sets and information about the N transmission time unit patterns.

In one embodiment, the notification message further includes a transmission time unit identifier, and the transmission time unit identifier is used to instruct the terminal device to transmit data in a transmission time unit indicated by the transmission time unit identifier.

In this embodiment, a transmission time unit that the terminal device can use in each slot is flexibly indicated by the transmission time unit identifier.

In one embodiment, the slot set is an even slot set or an odd slot set, a number of each slot in the even slot set is even, and a number of each slot in the odd slot set is odd; and the determining a transmission time unit pattern corresponding to the slot set includes: determining a combination of transmission time unit patterns corresponding to the even slot set and the odd slot set.

In this embodiment, when determining the transmission time unit patterns corresponding to the even slot set and the odd slot set, the network side device may directly determine a combination of transmission time unit patterns corresponding to the even slot set and the odd slot set, and does not need to determine the transmission time unit patterns one by one, thereby reducing complexity of a design procedure in the network side device and reducing power consumption of the network side device.

In one embodiment, the notification message further includes instruction information used to instruct the terminal device to transmit data in J aggregated transmission time units, J≥2, J is an integer, the J transmission time units are not contiguous, and are transmission time units, in at least one contiguous slot, that meet a preset aggregation condition corresponding to a transmission time unit pattern corresponding to the at least one slot.

In one embodiment, the aggregation condition is information that is corresponding to the transmission time unit pattern corresponding to the at least one slot and that is used to indicate transmission time units that need to be aggregated in the at least one slot.

In the foregoing two embodiments, the instruction information is used to instruct the terminal device to transmit data in the J aggregated transmission time units, thereby enlarging a basic time unit used by the terminal device for data transmission and improving data transmission efficiency.

According to a second aspect, this application provides a data transmission method, and the method includes: receiving a notification message sent by a network side device, where the notification message includes information about a slot set and information about a transmission time unit pattern, the information about the transmission time unit pattern is used to indicate the transmission time unit pattern corresponding to the slot set, the transmission time unit pattern is used to indicate a symbol location at which a transmission time unit in a slot in the slot set is located, and a quantity of symbols included in the transmission time unit is less than a quantity of symbols included in the slot; determining the transmission time unit in the slot based on the information about the transmission time unit pattern; and transmitting data in the determined transmission time unit.

According to the data transmission method provided in this application, a terminal device determines, by using the transmission time unit pattern determined by the network side device, to transmit data by using some symbols in each slot as a transmission time unit. In other words, the terminal device transmits data on some symbols in each slot instead of in the entire slot. In this case, the network side device may schedule a remaining symbol for another carrier for data transmission, so that a carrier used by the terminal and the another carrier can be deployed overlapping with each other.

In one embodiment, a quantity of pieces of information about the transmission time unit pattern and a quantity of slot sets are both N, N≥1, and N is an integer; and the determining the transmission time unit pattern based on the information about the transmission time unit pattern includes: determining the transmission time unit in a slot in a corresponding slot set in the N slot sets based on each of the N pieces of information about the transmission time unit pattern.

In one embodiment, the notification message further includes a transmission time unit identifier, where the transmission time unit identifier is used to instruct to transmit data in a transmission time unit indicated by the transmission time unit identifier, and the transmitting data in the determined transmission time unit includes: transmitting data in a transmission time unit that is corresponding to the transmission time unit identifier and that is in the determined transmission time unit.

In this embodiment, the terminal device can flexibly determine, by using the transmission time unit identifier, a transmission time unit that the terminal device can use in each slot.

In one embodiment, the notification message further includes instruction information used to instruct to transmit data in J aggregated transmission time units, J≥2, J is an integer, and the J transmission time units are transmission time units that meet a preset aggregation condition in at least one contiguous slot; and the transmitting data in the determined transmission time unit includes: aggregating the J transmission time units according to the instruction information, and transmitting data in the J aggregated transmission time units according to the instruction information.

In one embodiment, the aggregation condition is implicit information corresponding to a transmission time unit pattern corresponding to the at least one slot, and the implicit information is used to indicate transmission time units that need to be aggregated in the at least one slot.

According to a third aspect, this application provides a network side device, and the network side device includes unit modules configured to perform the operations of the method according to the implementations of the first aspect. The network side device may include: a processing unit, configured to determine a transmission time unit pattern corresponding to a slot set, where the transmission time unit pattern is used to indicate a symbol location at which a transmission time unit in a slot in the slot set is located, and a quantity of symbols included in the transmission time unit is less than a quantity of symbols included in the slot; and a sending unit, configured to send a notification message to a terminal device, where the notification message includes information about the slot set and information about the transmission time unit pattern determined by the processing unit, and the information about the transmission time unit is used to indicate the transmission time unit pattern.

In one embodiment, the processing unit is specifically configured to determine, based on a symbol occupation status of a first carrier in the slot, the transmission time unit pattern corresponding to the slot set, where the first carrier is a carrier that is deployed overlapping with a carrier used by the terminal device.

In one embodiment, a quantity of transmission time unit patterns determined by the processing unit and a quantity of slot sets are both N, N≥1, N is an integer, and the notification message sent by the sending unit includes information about the N slot sets and information about the N transmission time unit patterns.

In one embodiment, the notification message further includes a transmission time unit identifier, and the transmission time unit identifier is used to instruct the terminal device to transmit data in a transmission time unit indicated by the transmission time unit identifier.

In one embodiment, the slot set is an even slot set or an odd slot set, a number of each slot in the even slot set is even, and a number of each slot in the odd slot set is odd; and the processing unit is specifically configured to determine a combination of transmission time unit patterns corresponding to the even slot set and the odd slot set.

In one embodiment, the notification message sent by the sending unit further includes instruction information used to instruct the terminal device to transmit data in J aggregated transmission time units, J≥2, J is an integer, and the J transmission time units are transmission time units that meet a preset aggregation condition in at least one contiguous slot.

In one embodiment, the aggregation condition is information that is corresponding to a transmission time unit pattern corresponding to the at least one slot and that is used to indicate transmission time units that need to be aggregated in the at least one slot.

For technical effects of the network side device provided in this application, refer to technical effects of the first aspect or the implementations of the first aspect. Details are not described herein again.

According to a fourth aspect, this application provides a terminal device, and the terminal device includes unit modules configured to perform the operations of the method according to the implementations of the second aspect. The terminal device may include: a receiving unit, configured to receive a notification message sent by a network side device, where the notification message includes information about a slot set and information about a transmission time unit pattern, the information about the transmission time unit pattern is used to indicate the transmission time unit pattern corresponding to the slot set, the transmission time unit pattern is used to indicate a symbol location at which a transmission time unit in a slot in the slot set is located, and a quantity of symbols included in the transmission time unit is less than a quantity of symbols included in the slot; a processing unit, configured to determine the transmission time unit in the slot based on the information that is about the transmission time unit pattern and that is received by the receiving unit; and a transmission unit, configured to transmit data in the transmission time unit determined by the processing unit.

In one embodiment, a quantity of pieces of information about the transmission time unit pattern and a quantity of slot sets are both N, N≥2, and N is an integer; and the processing unit is specifically configured to determine the transmission time unit in a slot in a corresponding slot set in the N slot sets based on each of the N pieces of information about the transmission time unit pattern, and the N transmission time unit patterns are in a one-to-one correspondence with the N slot sets.

In one embodiment, the notification message received by the receiving unit further includes a transmission time unit identifier, where the transmission time unit identifier is used to instruct to transmit data in a transmission time unit indicated by the transmission time unit identifier; and the transmission unit is specifically configured to transmit data in a transmission time unit that is corresponding to the transmission time unit identifier and that is in the transmission time unit determined by the processing unit.

In one embodiment, the notification message received by the receiving unit further includes instruction information used to instruct to transmit data in J aggregated transmission time units, J≥2, J is an integer, and the J transmission time units are transmission time units that meet a preset aggregation condition in at least one contiguous slot; and the transmission unit is specifically configured to: aggregate the J transmission time units according to the aggregation instruction, and transmit data in the J aggregated transmission time units according to the aggregation instruction.

In one embodiment, the aggregation condition is information that is corresponding to a transmission time unit pattern corresponding to the at least one slot and that is used to indicate transmission time units that need to be aggregated in the at least one slot.

For technical effects of the terminal device provided in this application, refer to the technical effects of the second aspect or the implementations of the second aspect. Details are not described herein again.

With reference to the first aspect to the fourth aspect, in one embodiment, the slot includes M transmission time units, M≥1, M is an integer, and a total quantity of symbols included in the M transmission time units is less than or equal to the quantity of symbols included in the slot.

With reference to the first aspect to the fourth aspect, in one embodiment, when M>1, and the quantity of symbols included in the M transmission time units is equal to the quantity of symbols included in the slot, the transmission time unit pattern is one of the following six patterns: a pattern 1, indicating that in the slot, first and second symbols are a transmission time unit, third and fourth symbols are a transmission time unit, a fifth symbol is a transmission time unit, and sixth and seventh symbols are a transmission time unit; a pattern 2, indicating that in the slot, a first symbol is a transmission time unit, second to fourth symbols are a transmission time unit, a fifth symbol is a transmission time unit, and sixth and seventh symbols are a transmission time unit; a pattern 3, indicating that in the slot, first to third symbols are a transmission time unit, a fourth symbol is a transmission time unit, a fifth symbol is a transmission time unit, and sixth and seventh symbols are a transmission time unit; a pattern 4, indicating that in the slot, first to fifth symbols are a transmission time unit, and sixth and seventh symbols are a transmission time unit; a pattern 5, indicating that in the slot, a first symbol is a transmission time unit, and second to seventh symbols are a transmission time unit; and a pattern 6, indicating that in the slot, first and second symbols are a transmission time unit, and third to seventh symbols are a transmission time unit.

With reference to the first aspect and the third aspect, in one embodiment, the combination of transmission time unit pattern is one of the following seven combinations: a combination 1, including the pattern 1 corresponding to the even slot set, and the pattern 2 corresponding to the odd slot set; a combination 2, including the pattern 2 corresponding to the even slot set, and the pattern 2 corresponding to the odd slot set; a combination 3, including the pattern 3 corresponding to the even slot set, and the pattern 2 corresponding to the odd slot set; a combination 4, including the pattern 4 corresponding to the even slot set, and the pattern 2 corresponding to the odd slot set; a combination 5, including the pattern 1 corresponding to the even slot set, and the pattern 1 corresponding to the odd slot set; a combination 6, including the pattern 3 corresponding to the even slot set, and the pattern 1 corresponding to the odd slot set; and a combination 7, including the pattern 4 corresponding to the even slot set, and the pattern 1 corresponding to the odd slot set.

According to a fifth aspect, this application further provides a network side device, including a processor, a memory, and a transceiver, and the processor may execute a program or an instruction stored in the memory to implement the data transmission method according to the implementations of the first aspect.

For technical effects of the network side device provided in this application, refer to technical effects of the first aspect or the implementations of the first aspect. Details are not described herein again.

According to a sixth aspect, this application further provides a terminal device, including a processor, a memory, and a transceiver, and the processor may execute a program or an instruction stored in the memory to implement the data transmission method according to the implementations of the second aspect.

For technical effects of the terminal device provided in this application, refer to the technical effects of the second aspect or the implementations of the second aspect. Details are not described herein again.

According to a seventh aspect, this application further provides a storage medium or a computer program product. The computer readable storage medium or computer program product may store a program (e.g., one or more instructions), and when the program is executed, some or all of the operations in embodiments of the data transmission method provided in this application may be performed.

According to an eighth aspect, this application further provides a communications system, including the network side device according to the third aspect or any implementation of the third aspect, and the terminal device according to the fourth aspect or any implementation of the fourth aspect; or including the network side device according to the fifth aspect or any implementation of the fifth aspect, and the terminal device according to the sixth aspect or any implementation of the sixth aspect.

According to a ninth aspect, this application further provides a communications device, comprising a memory, a processor, and a computer program that is stored in the memory and that can run on the processor, wherein when executing the program, the processor is configured to implement the data transmission method provided in this application.

DESCRIPTION OF EMBODIMENTS

First, the terms "system" and "network" may be used interchangeably in this specification. The term "and" in this specification describes only an association relationship for describing associated objects and represents that three relationships may exist. For example, A and B may represent the following three cases: Only A exists, both A and B exist, and only B exists. In addition, the character "/" in this specification generally indicates an "or" relationship between the associated objects.

In addition, the terms "include", "contain", and any other variant thereof are intended to cover a non-exclusive inclusion. For example, a process, a method, a system, a product, or a device that includes a series of operations or units is not limited to the listed operations or units, but In one embodiment further includes an unlisted operation or unit, or In one embodiment further includes another inherent operation or unit of the process, the method, the product, or the device.

In addition, a data transmission method described in this application may be applied to a Long Term Evolution system, and a measurement method provided in this application may be applied to a Long Term Evolution system, Long Term Evolution Advanced (LTE-A), a subsequently evolved system of the LTE system, such as a fifth generation 5G system, and other wireless communications systems using various radio access technologies.

Figure 1:
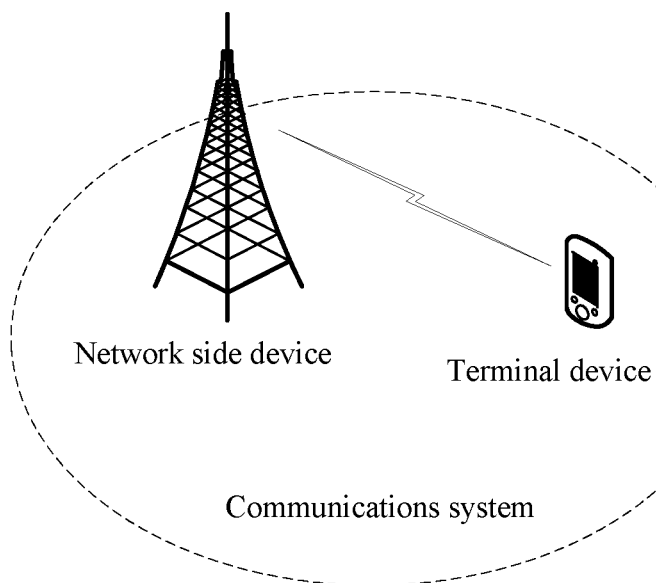
FIG. 1 is a schematic structural diagram of a communications system according to this application.

As shown in FIG. 1, the data transmission method provided in this application may be applied to a communications system that includes a network side device and at least one terminal device.

The network side device may be a base station (BS) or a base transceiver station (BTS), and is an apparatus that is deployed in a radio access network and that is configured to provide a wireless communication function for the terminal device. In systems using different radio access technologies, names of a device that has a base station function may be different. For example, in an LTE network, the device is referred to as an evolved NodeB (eNB or eNodeB); in a third generation 3G network, the device is referred to as a NodeB (Node B); or the device is applied to a fifth generation communications system. For ease of description, in this application, the devices mentioned above that have the base station function are collectively referred to as a network side device.

The terminal device in this application may include various handheld devices, in-vehicle devices, wearable devices, or computing devices that have a wireless communication function, or another processing device connected to a wireless modem, and user equipment (UE), a mobile station (MS), a terminal (terminal), and the like that are in various forms. For ease of description, in this application, the devices mentioned above are collectively referred to as a terminal device.

Figure 2:
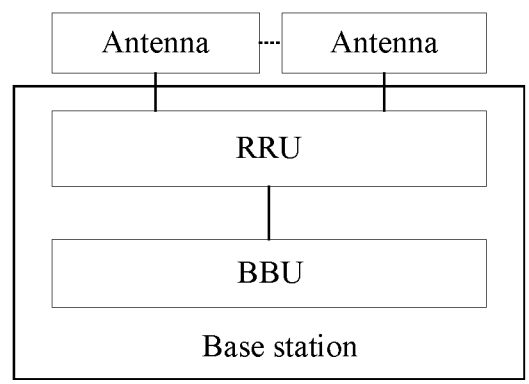
FIG. 2 is a schematic structural diagram of a base station according to this application.

As shown in FIG. 2, this application provides a base station, including a remote radio unit (RRU), a building baseband unit (BBU), and an antenna system.

The RRU includes a digital intermediate frequency module, a transceiver module, a power amplification and filtering module. The digital intermediate frequency module is configured to perform modulation and demodulation, digital up- and down-frequency conversion, A/D conversion, and the like during optical transmission. The transceiver module converts an intermediate frequency signal into a radio frequency signal. After passing through the power amplification and filtering module, the radio frequency signal is transmitted through an antenna port. The BBU is configured to implement functions such as channel encoding/decoding, baseband signal modulation/demodulation, and protocol processing, also provides an interface function of interacting with an upper-layer network element, and completes a processing process of a physical layer core technology, such as CDMA processing in 3G and OFDM/MIMO processing in LTE. The antenna system mainly includes antennas and may further include a coupler, a divider, and the like, and is configured to transmit data between the RRU and another network element, such as a terminal device.

Figure 3:
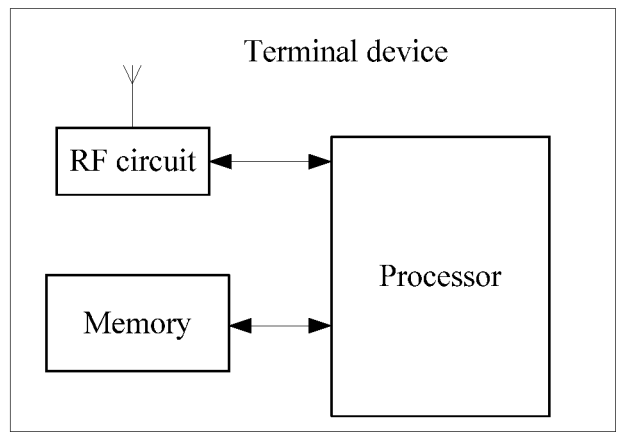
FIG. 3 is a first schematic structural diagram of a terminal device according to this application.

As shown in FIG. 3, this application provides a terminal device, including a processor, a memory, an RF circuit, and the like.

The processor is a control center of the terminal device, and connects all components of the entire terminal device by using various interfaces and lines. By running or executing a software program and/or a module stored in the memory and by invoking data stored in the memory, the processor performs various functions of the terminal device and processes data, to perform overall monitoring on the terminal device. The processor may include a digital signal processor device, a microprocessor device, an analog-to-digital converter, a digital-to-analog converter, and the like, and control and signal processing capabilities of the terminal device can be allocated to these devices based on capabilities of these devices. The RF circuit may be configured to receive and transmit information and transmit received information to the processor for processing. The RF circuit usually includes but is not limited to an antenna, at least one amplifier, a transceiver, a coupler, a low noise amplifier (LNA), a duplexer, and the like, and communicates with a network and another device through wireless communication. The wireless communication may use any communication standard or protocol, including but not limited to a Global System for Mobile Communications (GSM), a general packet radio service (GPRS), Code Division Multiple Access (CDMA), Wideband Code Division Multiple Access (WCDMA), LTE (long term evolution), Wi-Fi or low power Wi-Fi, a WLAN technology, and the like.

Figure 4:
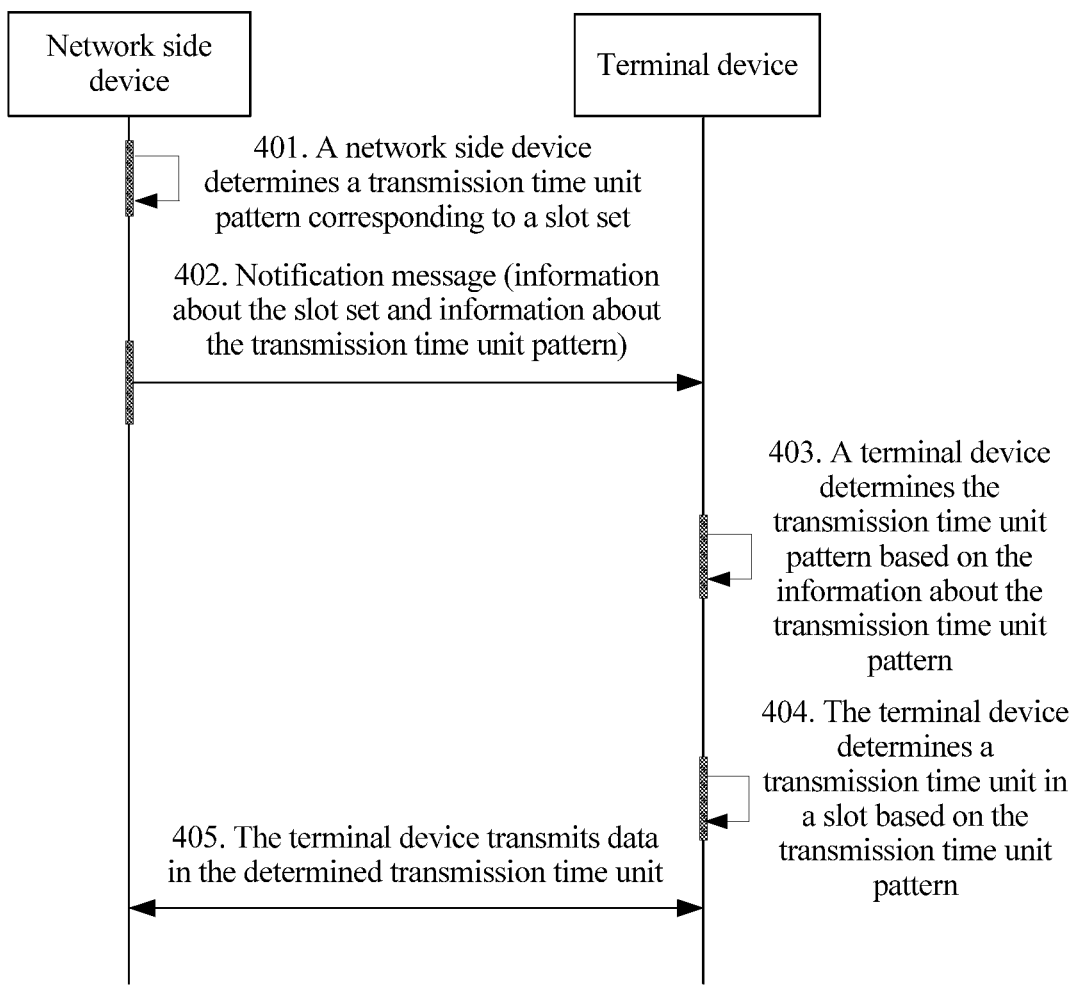
FIG. 4 is a flowchart of an embodiment of a data transmission method according to this application.

Based on the communications system shown in FIG. 1, FIG. 4 is a flowchart of an embodiment of a data transmission method according to this application. The method includes the following operations.

Operation 401: A network side device determines a transmission time unit pattern corresponding to a slot set, where the transmission time unit pattern is used to indicate a symbol location at which a transmission time unit in a slot in the slot set is located, and a quantity of symbols included in the transmission time unit is less than a quantity of symbols included in each slot.

Operation 402: The network side device sends a notification message to a terminal device, where the notification message includes information about the slot set and information about the transmission time unit pattern, and the information about the transmission time unit pattern is used to indicate the transmission time unit pattern.

In this application, a slot includes M transmission time units, M≥1, and M is an integer. A total quantity of symbols included in the M transmission time units is less than or equal to a quantity of symbols included in the slot.

In an example, some symbols in the slot are divided into M transmission time units, and a total quantity of symbols included in the M transmission time units is less than a quantity of symbols included in the slot. In this case, after receiving the notification message and determining the corresponding transmission time unit pattern based on the information about the transmission time unit, the terminal device may directly transmit data on M transmission time units indicated by the transmission time unit pattern, and does not transmit data on remaining symbols that are not divided into transmission time units.

For example, when the total quantity of symbols included in the M transmission time units is less than the quantity of symbols included in the slot, the transmission time unit pattern may be one of the following seven patterns:

a pattern a, indicating that in the slot, third and fourth symbols are a transmission time unit, and sixth and seventh symbols are a transmission time unit;

a pattern b, indicating that in the slot, second to fourth symbols are a transmission time unit, and sixth and seventh symbols are a transmission time unit;

a pattern c, indicating that in the slot, a fourth symbol is a transmission time unit, and sixth and seventh symbols are a transmission time unit;

a pattern d, indicating that sixth and seventh symbols are a transmission time unit in the slot;

a pattern e, indicating that a first symbol is a transmission time unit in the slot;

a pattern f, indicating that first and second symbols are a transmission time unit in the slot; and a pattern g, indicating that a fourth symbol is a transmission time unit in the slot.

It may be understood that the seven transmission time unit patterns are merely examples, the transmission time unit patterns provided in this application may further indicate other division schemes of transmission time units, and the other division schemes are not listed one by one herein.

In one embodiment, all symbols in a slot are divided into M transmission time units, M>1, and a total quantity of symbols included in the M transmission time units is equal to a quantity of symbols included in the slot. In this case, when sending the notification message to the terminal device, the network side device may further add, to the notification message, a transmission time unit identifier allocated to the terminal device in each slot, so that the terminal device transmits data in a transmission time unit indicated by the received transmission time unit identifier.

For example, when M>1, and the total quantity of symbols included in the M transmission time units is equal to the quantity of symbols included in the slot, the transmission time unit pattern may be one of the following seven patterns:

a pattern 1, indicating that in the slot, first and second symbols are a transmission time unit, third and fourth symbols are a transmission time unit, a fifth symbol is a transmission time unit, and sixth and seventh symbols are a transmission time unit;

a pattern 2, indicating that in the slot, a first symbol is a transmission time unit, second to fourth symbols are a transmission time unit, a fifth symbol is a transmission time unit, and sixth and seventh symbols are a transmission time unit;

a pattern 3, indicating that in the slot, first to third symbols are a transmission time unit, a fourth symbol is a transmission time unit, a fifth symbol is a transmission time unit, and sixth and seventh symbols are a transmission time unit;

a pattern 4, indicating that in the slot, first to fifth symbols are a transmission time unit, and sixth and seventh symbols are a transmission time unit;

a pattern 5, indicating that in the slot, a first symbol is a transmission time unit, and second to seventh symbols are a transmission time unit;

a pattern 6, indicating that in the slot, first and second symbols are a transmission time unit, and third to seventh symbols are a transmission time unit; and a pattern 7, indicating that in the slot, first to third symbols are a transmission time unit, a fourth symbol is a transmission time unit, and fifth to seventh symbols are a transmission time unit.

In the patterns 1 to 7, identifiers of transmission time units in each slot can be set to 0, 1, 2 . . . in a sequence of symbols. For example, the pattern 1 is used as an example. In the transmission time units indicated by the pattern 1, an identifier of the transmission time unit that includes the first and second symbols is 0, an identifier of the transmission time unit that includes the third and fourth symbols is 1, an identifier of the transmission time unit that includes the fifth symbol is 2, and an identifier of the transmission time unit that includes the sixth and seventh symbols is 3. It is assumed that in each slot in a slot set corresponding to the pattern 1, transmission time units allocated by the network side device to the terminal for data transmission are the transmission time unit 1 and the transmission time unit 3. The network side device may add the identifiers 1 and 3 to the notification message and send the notification message to the terminal device, so that the terminal device transmits data in the transmission time unit 1 and the transmission time unit 3.

In one embodiment, the network side device may determine N transmission time unit patterns, N≥2, and N is an integer. The N transmission time unit patterns are in a one-to-one correspondence with N slot sets, and each slot in each slot set is corresponding to a transmission time unit pattern corresponding to the slot set.

For example, the network side device needs to determine a transmission time unit pattern corresponding to a radio frame (the radio frame has duration of 10 milliseconds and includes 20 slots) each time. The network side device determines that the radio frame may be divided into three slot sets: a slot set that includes a sixth slot, a slot set that includes a seventh slot, and a slot set that includes slots other than the sixth and seventh slots. In this case, the network side device needs to determine transmission time unit patterns corresponding to the three slot sets.

In this application, the network side device may separately determine the N transmission time unit patterns corresponding to the N slot sets; or may directly determine a transmission time unit pattern combination corresponding to the N slot sets. The transmission time unit pattern combination includes the N transmission time unit patterns respectively corresponding to the N slot sets.

In an example, a plurality of slots are divided into an even slot set and an odd slot set. A number of each slot in the even slot set is even, and a number of each slot in the odd slot set is odd.

It may be understood that a slot number may be a defined number. For example, a radio frame includes 20 slots, and the 20 slots are sequentially numbered 0 to 19. In this case, an even slot is a slot numbered 0, 2, 4, . . . , 16, or 18 in the radio frame, and an odd slot is a slot numbered 1, 3, 5, . . . , 17, or 19 in the radio frame. Alternatively, a subframe includes two slots respectively numbered 0 and 1. In this case, an even slot is a slot 0 in the subframe, and an odd slot is a slot 1 in the subframe. Alternatively, a slot number may be designed according to an actual requirement, and this is not limited in this application.

The network side device may separately determine a transmission time unit pattern corresponding to the even slot set and a transmission time unit pattern corresponding to the odd slot set, or may determine a combination of transmission time unit patterns corresponding to the even slot set and the odd slot set.

For example, with reference to the foregoing listed patterns 1 to 4, the combination of transmission time unit patterns corresponding to the even slot set and the odd slot set may be any one of the following seven combinations:

a combination 1: the pattern 1 corresponding to the even slot set, and the pattern 2 corresponding to the odd slot set;

a combination 2: the pattern 2 corresponding to the even slot set, and the pattern 2 corresponding to the odd slot set;

a combination 3: the pattern 3 corresponding to the even slot set, and the pattern 2 corresponding to the odd slot set;

a combination 4: the pattern 4 corresponding to the even slot set, and the pattern 2 corresponding to the odd slot set;

a combination 5: the pattern 1 corresponding to the even slot set, and the pattern 1 corresponding to the odd slot set;

a combination 6: the pattern 3 corresponding to the even slot set, and the pattern 1 corresponding to the odd slot set; and a combination 7: the pattern 4 corresponding to the even slot set, and the pattern 1 corresponding to the odd slot set.

Alternatively, with reference to the foregoing listed patterns a to d, the combination of transmission time unit patterns corresponding to the even slot set and the odd slot set may be any one of the following seven combinations:

a combination (1): the pattern a corresponding to the even slot set, and the pattern b corresponding to the odd slot set;

a combination (2): the pattern b corresponding to the even slot set, and the pattern b corresponding to the odd slot set;

a combination (3): the pattern c corresponding to the even slot set, and the pattern b corresponding to the odd slot set;

a combination (4): the pattern d corresponding to the even slot set, and the pattern b corresponding to the odd slot set;

a combination (5): the pattern a corresponding to the even slot set, and the pattern a corresponding to the odd slot set;

a combination (6): the pattern c corresponding to the even slot set, and the pattern a corresponding to the odd slot set; and a combination (7): the pattern d corresponding to the even slot set, and the pattern a corresponding to the odd slot set.

In an example, the network side device may determine, based on a symbol occupation status of a first carrier in the slot in the slot set, the transmission time unit pattern corresponding to the slot set. The first carrier is a carrier that is deployed overlapping with a carrier used by the terminal device.

For example, the symbol occupation status of the first carrier in the slot in the slot set may be a symbol occupation condition of a full-bandwidth physical channel and/or a physical signal of the first carrier in the slot. The network side device may select a symbol location at which a transmission time unit is located as a transmission time unit pattern of a symbol that is not occupied by the full-bandwidth physical channel and/or the physical signal of the first carrier. Therefore, in an overlapping area of the carrier used by the terminal device and the first carrier, when the terminal device transmits data in the transmission time unit indicated by the transmission time unit pattern, the data is not interfered with by the full-bandwidth physical channel and/or the physical signal of the first carrier. In addition, the terminal device does not transmit data by using the carrier of the terminal device on a symbol on which the full-bandwidth physical channel and/or the physical signal of the first carrier is sent, thereby avoiding mutual interference between the data transmitted by the terminal device and the full-bandwidth physical channel and/or the physical signal transmitted on the first carrier.

With reference to an LTE carrier and a new radio (new radio, NR) carrier in a 5G network, three possible application scenarios are used below as examples to describe a manner in which the network side device determines a transmission time unit pattern for the terminal device.

It is assumed that the NR carrier and the LTE carrier are deployed overlapping with each other. If the terminal device needs to transmit data on the NR carrier, the network side device may determine a proper transmission time unit pattern for the terminal device based on a data transmission status of the LTE carrier in an overlapping area of the LTE carrier and the NR carrier, that is, determine a transmission time unit pattern that can avoid mutual interference between the data transmitted by the terminal device on the NR carrier and data transmitted on the LTE carrier.

In a first possible application scenario, a physical downlink control channel (downlink control information, PDCCH) exists in each downlink subframe of the LTE carrier, and a cell-specific reference signal (cell-specific reference signal, CRS) is sent in each downlink subframe. The PDCCH is located on the first M symbols of each downlink subframe, and M may be 1, 2, 3, or 4. In other words, the PDCCH is located on the first M symbols of a slot 0 (an even slot) in each downlink subframe.

The CRS is sent on each RB of the LTE carrier, in other words, the CRS is sent by using the LTE carrier in each slot, and when a cell uses different quantities of antenna ports, a symbol location at which the CRS is located also changes. For example, if a normal cyclic prefix (normal cyclic prefix) is used, when the cell uses one or two antenna ports, the CRS is sent on first and fifth symbols in a slot 0 (namely, an even slot) and a slot 1 (namely, an odd slot); and when the cell uses four antenna ports, the CRS is sent on first, second, and fifth symbols in the slot 0 and the slot 1.

Figure 5:
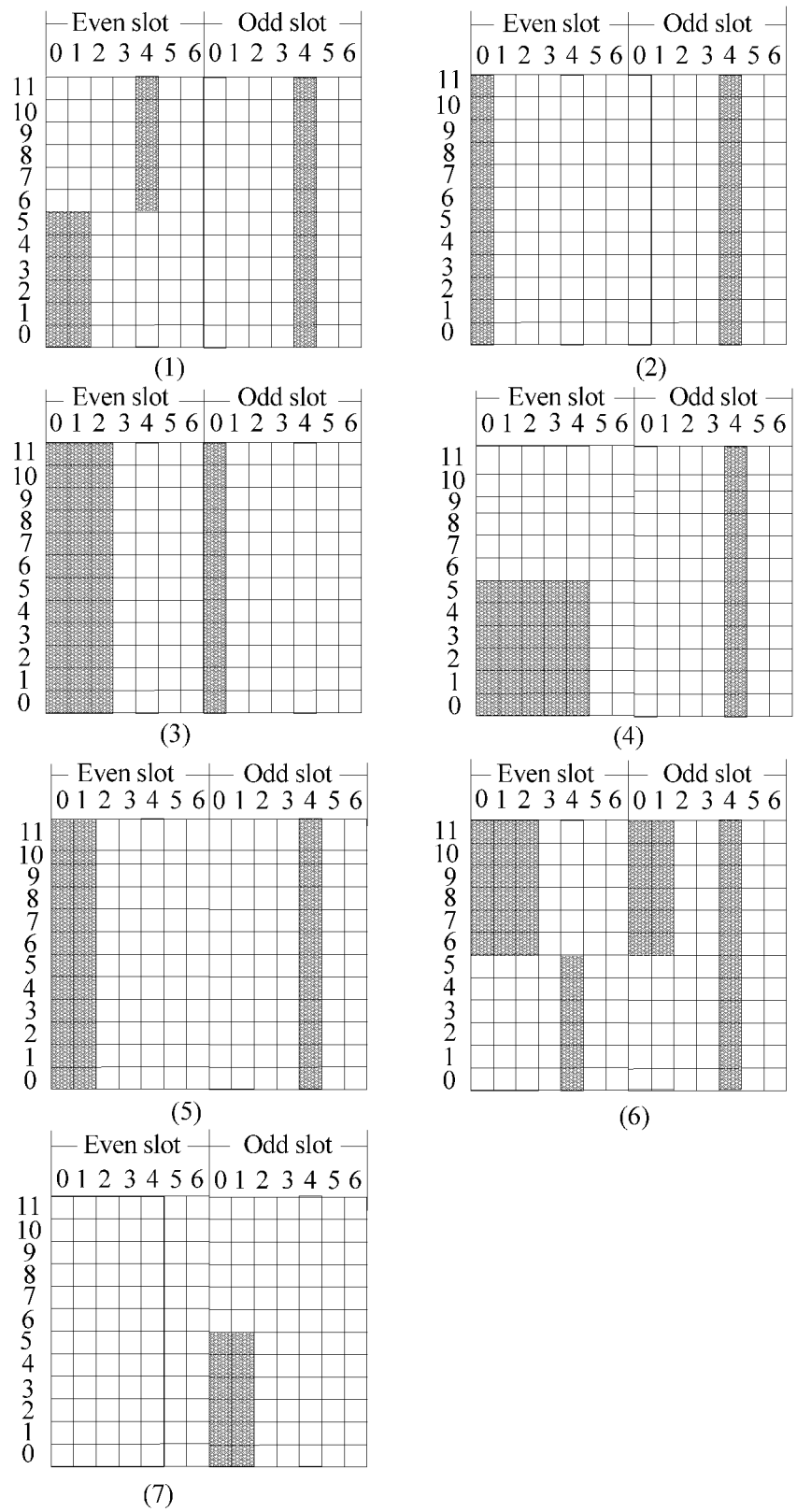
FIG. 5 is a schematic diagram of symbol occupation statuses of a PDCCH and a CRS in an even slot and an odd slot according to this application.

Based on a structure of a resource block (resource block, RB), FIG. 5 shows symbol occupation statuses of the PDCCH and the CRS in an even slot and an odd slot in different cases. It may be understood that one RB may include 12 subcarriers in frequency domain: a subcarrier 0 to a subcarrier 11, and may include one slot in time domain, including a symbol 0 to a symbol 6. In (1), (2), (3), (4), (5), (6), and (7) in FIG. 5, a shaded symbol is a symbol occupied by the PDCCH and/or the CRS in LTE. To avoid mutual interference between the data transmitted by the terminal device on the NR carrier and each of the PDCCH and the CRS, the network side device may determine a symbol location at which an indicated transmission time unit is located as a transmission time unit pattern of a symbol that is not occupied by the PDCCH and/or the CRS, so that data is not transmitted by using the NR carrier on symbols on which the PDCCH and the CRS is sent by using the LTE carrier, and instead, the data is transmitted on a symbol other than the symbols on which the PDCCH and the CRS is sent by using the LTE carrier, to avoid mutual interference between the data transmitted on the NR carrier and each of the PDCCH and the CRS.

Specifically, when the PDCCH occupies two symbols and the CRS is transmitted through one or two antenna ports, as shown in (1) in FIG. 5, first and second symbols in an even slot are used as the PDCCH, and the CRS is sent on first and fifth symbols in the even slot and an odd slot. When the terminal device transmits data by using the NR carrier on third, fourth, sixth, and seventh symbols in the even slot, and second to fourth, sixth, and seventh symbols in the odd slot, the data transmitted by the terminal device and each of the PDCCH and the CRS do not interfere with each other. In this case, the network side device may determine the transmission time unit patterns included in the combination 1 or the combination (1) as proper transmission time unit patterns.

When the network side device determines the combination 1 as the combination of transmission time unit patterns corresponding to the even slot set and the odd slot set, the network side device may instruct, by using the notification message, the terminal device to transmit data on transmission time units that are identified as 1 and 3 in each even slot corresponding to the pattern 1 and each odd slot corresponding to the pattern 2.

It may be understood that in each even slot corresponding to the pattern 1, a transmission time unit 1 includes third and fourth symbols in the even slot, and a transmission time unit 3 includes sixth and seventh symbols in the even slot; and in each odd slot corresponding to the pattern 2, a transmission time unit 1 includes second to fourth symbols in the odd slot, and a transmission time unit 3 includes sixth and seventh symbols in the odd slot. Therefore, when the PDCCH in LTE occupies two symbols, and the CRS is transmitted through one or two antenna ports, the network side device may determine the combination 1 as the combination of transmission time unit patterns corresponding to the even slot set and the odd slot set, so that the data transmitted by the terminal device on the NR carrier and each of the PDCCH and the CRS in LTE do not interfere with each other.

Similarly, when the network side device determines the combination (1) as the combination of transmission time unit patterns corresponding to the even slot set and the odd slot set, the two transmission time units indicated in the pattern a corresponding to the even slot set respectively include the third and fourth symbols, and the sixth and seventh symbols in the even slot, and two transmission time units indicated in the pattern b corresponding to the odd slot set respectively include the second to fourth symbols, and the sixth and seventh symbols in the odd slot. Therefore, when the PDCCH in LTE occupies two symbols, and the CRS is transmitted through one or two antenna ports, the network side device may determine the combination (1) as the combination of transmission time unit patterns corresponding to the even slot set and the odd slot set, so that the data transmitted by the terminal device on the NR carrier and each of the PDCCH and the CRS in LTE do not interfere with each other.

When the PDCCH occupies one symbol and the CRS is transmitted through one or two antenna ports, as shown in (2) in FIG. 5, a first symbol in an even slot is used as the PDCCH, and the CRS is sent on first and fifth symbols in the even slot and an odd slot. When the terminal device transmits data by using the NR carrier on second to fourth, sixth, and seventh symbols in the even slot and the odd slot, the data transmitted by the terminal device and each of the PDCCH and the CRS do not interfere with each other. In this case, the network side device may determine the combination 2 as the combination of transmission time unit patterns corresponding to the even slot set and the odd slot set, and instruct, by using the notification message, the terminal device to transmit data on transmission time units identified as 1 and 3 in each even slot and each odd slot that are corresponding to the pattern 2; or determine the combination (2) as the combination of transmission time unit patterns corresponding to the even slot set and the odd slot set.

When the PDCCH occupies three symbols and the CRS is transmitted through one or two antenna ports, as shown in (3) in FIG. 5, first to third symbols in an even slot are used as the PDCCH, and the CRS is sent on first and fifth symbols in the even slot and an odd slot. When the terminal device transmits data by using the NR carrier on fourth, sixth, and seventh symbols in the even slot, and second to fourth, sixth, and seventh symbols in the odd slot, the data transmitted by the terminal device and each of the PDCCH and the CRS do not interfere with each other. In this case, the network side device may determine the combination 3 as the combination of transmission time unit patterns corresponding to the even slot set and the odd slot set, and instruct, by using the notification message, the terminal device to transmit data on transmission time units identified as 1 and 3 in each even slot corresponding to the pattern 3 and each odd slot corresponding to the pattern 2; or determine the combination (3) as the combination of transmission time unit patterns corresponding to the even slot set and the odd slot set.

When the PDCCH occupies four symbols and the CRS is transmitted through one or two antenna ports, as shown in (4) in FIG. 5, first to fourth symbols in an even slot are used as the PDCCH, and the CRS is sent on first and fifth symbols in the even slot and an odd slot. When the terminal device transmits data by using the NR carrier on sixth and seventh symbols in the even slot, and second to fourth, sixth, and seventh symbols in the odd slot, the data transmitted by the terminal device and each of the PDCCH and the CRS do not interfere with each other. In this case, the network side device may determine the combination 4 as the combination of transmission time unit patterns corresponding to the even slot set and the odd slot set, and instruct, by using the notification message, the terminal device to transmit data in a transmission time unit identified as 1 in each even slot corresponding to the pattern 4 and transmission time units identified as 1 and 3 in each odd slot corresponding to the pattern 2; or determine the combination (4) as the combination of transmission time unit patterns corresponding to the even slot set and the odd slot set.

When the PDCCH occupies one or two symbols and the CRS is transmitted through four antenna ports, as shown in (5) in FIG. 5, a first symbol or first and second symbols in an even slot is/are used as the PDCCH, and the CRS is sent on first, second, and fifth symbols in the even slot and an odd slot. When the terminal device transmits data by using the NR carrier on third, fourth, sixth, and seventh symbols in the even slot and the odd slot, the data transmitted by the terminal device and each of the PDCCH and the CRS do not interfere with each other. In this case, the network side device may determine the combination 5 as the combination of transmission time unit patterns corresponding to the even slot set and the odd slot set, and instruct, by using the notification message, the terminal device to transmit data on transmission time units identified as 1 in each even slot and each odd slot that are corresponding to the pattern 1; or determine the combination (5) as the combination of transmission time unit patterns corresponding to the even slot set and the odd slot set.

When the PDCCH occupies three symbols and the CRS is transmitted through four antenna ports, as shown in (6) in FIG. 5, first to third symbols in an even slot are used as the PDCCH, and the CRS is sent on first, second, and fifth symbols in the even slot and an odd slot. When the terminal device transmits data by using the NR carrier on fourth, sixth, and seventh symbols in the even slot, and third, fourth, sixth, and seventh symbols in the odd slot, the data transmitted by the terminal device and each of the PDCCH and the CRS do not interfere with each other. In this case, the network side device may determine the combination 6 as the combination of transmission time unit patterns corresponding to the even slot set and the odd slot set, and instruct, by using the notification message, the terminal device to transmit data on transmission time units identified as 1 and 3 in each even slot corresponding to the pattern 2 and each odd slot corresponding to the pattern 1; or determine the combination (6) as the combination of transmission time unit patterns corresponding to the even slot set and the odd slot set.

When the PDCCH occupies four symbols and the CRS is transmitted through four antenna ports, as shown in (6) in FIG. 5, first to fourth symbols in an even slot are used as the PDCCH, and the CRS is sent on first, second, and fifth symbols in the even slot and an odd slot. When the terminal device transmits data by using the NR carrier on sixth and seventh symbols in the even slot, and third, fourth, sixth, and seventh symbols in the odd slot, the data transmitted by the terminal device and each of the PDCCH and the CRS do not interfere with each other. In this case, the network side device may determine the combination 7 as the combination of transmission time unit patterns corresponding to the even slot set and the odd slot set, and instruct, by using the notification message, the terminal device to transmit data in a transmission time unit identified as 1 in each even slot corresponding to the pattern 4 and transmission time units identified as 1 and 3 in each odd slot corresponding to the pattern 1; or determine the combination (7) as the combination of transmission time unit patterns corresponding to the even slot set and the odd slot set.

With reference to the first possible application scenario, in a second possible application scenario, the network side device may periodically send a channel state information-reference signal (channel state information-reference signal, CSI-RS) in LTE. The CSI-RS is used for channel information measurement and can support measurement of eight antenna ports. In LTE, the network side device may send configuration information to the terminal device to indicate a slot on which the CSI-RS is sent in a radio frame.

For example, it is assumed that when the network side device determines that a PDCCH occupies three symbols and a CRS is transmitted through four antenna ports, and determines that the configuration information indicates that the CSI-RS uses four antenna ports. In this case, a first CSI-RS is sent on sixth and seventh symbols in a slot 0, and a sending period is 5 milliseconds. In other words, in a radio frame, the CSI-RS is sent on sixth and seventh symbols in the slot 0 and a slot 10.

Figure 6:
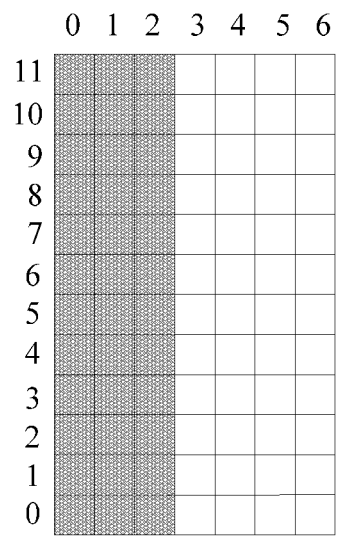
FIG. 6 is a schematic diagram of symbol occupation statuses of a PDCCH, a CRS, and a CSI-RS in a slot according to this application.

To be specific, as shown in FIG. 6, in the slot 0 and the slot 10, first to third symbols are used as the PDCCH, the CRS is sent on first, second, and fifth symbols, and the CSI-RS is sent on sixth and seventh symbols. When the terminal device transmits data by using the NR carrier on fourth symbols in the slot 0 and the slot 10, the data transmitted by the terminal device and each of the PDCCH, the CRS, and the CSI-RS do not interfere with each other. In this case, the network side device may determine a slot 0 and a slot 10 in a radio frame as an even slot set 1, and determine the pattern g as a transmission time unit pattern corresponding to the even slot set 1; or determine the pattern 7 as a transmission time unit pattern corresponding to the even slot set 1, and instruct, by using the notification message, the terminal device to transmit data in transmission time units 1 in the slot 0 and the slot 10 that are corresponding to the pattern 7.

Further, as shown in (6) in FIG. 5, in even slots other than the slot 0 and the slot 10, first to third symbols are used as the PDCCH, and the CRS is sent on first, second, and fifth symbols. The CRS is sent on the first, second, and fifth symbols of each odd slot in the radio frame. In this case, the network side device may determine the even slots other than the slot 0 and the slot 10 in the radio frame as an even slot set 2, and determine odd slots in the radio frame as an odd slot set; and determine (6) as a combination of transmission time unit patterns corresponding to the even slot set 2 and the odd slot set; or determine the combination 6 as a combination of transmission time unit patterns corresponding to the even slot set 2 and the odd slot set, and instruct, by using the notification message, the terminal device to transmit data in a transmission time unit identified as 1 in each even slot corresponding to the pattern 4 and transmission time units identified as 1 and 3 in each odd slot corresponding to the pattern 1.

With reference to the first possible application scenario, in a third possible application scenario, in LTE, the network side device may configure some subframes in a radio frame as a multimedia broadcast multicast service single frequency network (multimedia broadcast multicast service single frequency network, MBSFN) subframes. No PDCCH is sent in the MBSFN subframe, or a PDCCH occupies a first symbol or the first two symbols in the MBSFN, and no CRS is transmitted on a remaining symbol.

For example, it is assumed that the network side device determines that a subframe 3 in a radio frame (that is, a slot 6 and a slot 7 in the radio frame) is an MBSFN subframe, and another frame in the radio frame is a normal subframe. In a normal subframe, the PDCCH occupies one symbol and a CRS is transmitted through one or two antenna ports.

Figure 7:
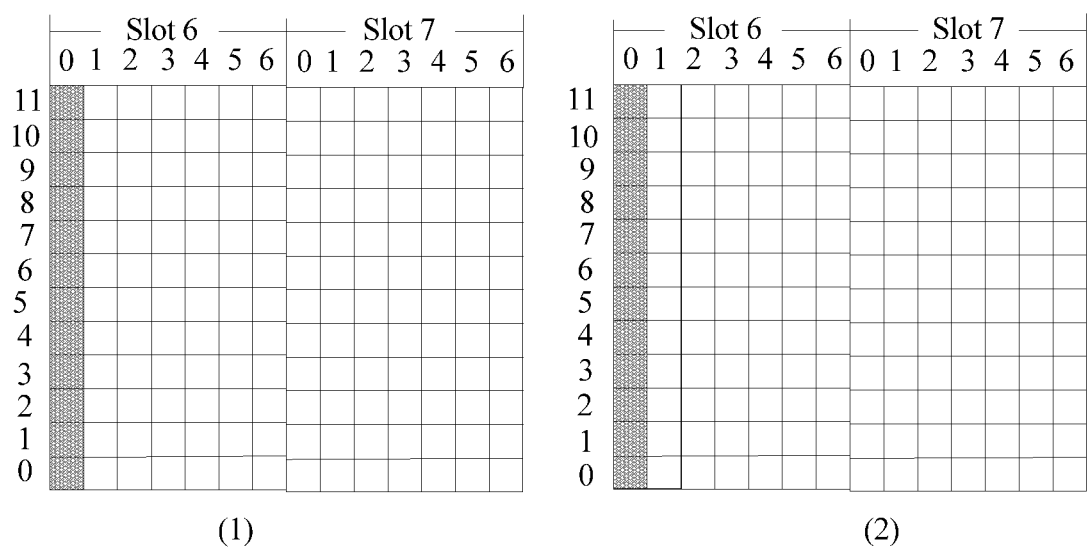
FIG. 7 is a schematic diagram of a symbol occupation status of a PDCCH in an MBSFN subframe according to this application.

When the PDCCH occupies one symbol in the MBSFN subframe, as shown in (1) in FIG. 7, the PDCCH is sent by using the LTE carrier on a first symbol in the slot 6, and a physical signal and/or a full-bandwidth physical channel are/is not sent by using the LTE carrier in the slot 7. When the terminal device transmits data by using the NR carrier on second to seventh symbols in the slot 6, the data transmitted by the terminal device and the PDCCH do not interfere with each other. In this case, the network side device may determine the slot 6 as an even slot set 3; and determine the pattern e as a transmission time unit pattern corresponding to the even slot set 3; or determine the pattern 5 as a transmission time unit pattern corresponding to the even slot set 3, and instruct, by using the notification message, the terminal device to transmit data in a transmission time unit 1 in the slot 6 corresponding to the pattern 3.

When the PDCCH occupies one symbol in the MBSFN subframe, as shown in (2) in FIG. 7, the PDCCH is sent by using the LTE carrier on first and second symbols in the slot 6, and a physical signal and/or a full-bandwidth physical channel are/is not sent by using the LTE carrier in the slot 7. When the terminal device transmits data by using the NR carrier on third to seventh symbols in the slot 6, the data transmitted by the terminal device and the PDCCH do not interfere with each other. In this case, the network side device may determine the pattern f as a transmission time unit pattern corresponding to the even slot set 3; or determine the pattern 6 as a transmission time unit pattern corresponding to the even slot set 3, and instruct, by using the notification message, the terminal device to transmit data in a transmission time unit 1 in the slot 6 corresponding to the pattern 3.

When the terminal device transmits data by using the NR carrier in the entire slot 7, the data transmitted by the terminal device and the PDCCH do not interfere with each other. Therefore, the network side device may determine the slot 7 as an odd slot set 1, and may select any one of the patterns a to f as a transmission time unit pattern corresponding to the odd slot set 1, or select any one of the patterns 1 to 6 as a transmission time unit pattern corresponding to the odd slot set 1. For example, when the network side device determines the pattern 2 as the transmission time unit pattern corresponding to the odd slot set 1, the network side device may instruct, by using the notification message, the terminal device to transmit data on transmission time units identified as 0, 1, 2, and 3 (that is, each transmission time unit in the slot 7) in the slot 7 corresponding to the pattern 2.

Further, as shown in (2) in FIG. 5, in even slots other than the slot 6, a first symbol is used as the PDCCH, and the CRS is sent on first and fifth symbols. In odd slots other than the slot 7, the CRS is sent on first and fifth symbols. When the terminal device transmits data by using the NR carrier on second to fourth, sixth, and seventh symbols in the even slots other than the slot 6 and the odd slots other than the slot 7, the data transmitted by the terminal device and each of the PDCCH and the CRS do not interfere with each other. In this case, the network side device may determine the even slots other than the slot 6 as an even slot set 4, determine the odd slots other than the slot 7 in as an odd slot set 2; and determine the combination (2) as a combination of transmission time unit patterns corresponding to the even slot set 4 and the odd slot set 2; or determine the combination 2 as a combination of transmission time unit patterns corresponding to the even slot set 4 and the odd slot set 2, and instruct, by using the notification message, the terminal device to transmit data on transmission time units identified as 1 and 3 in each even slot and each odd slot that are corresponding to the pattern 2.

In one embodiment, the transmission time unit pattern may be used to indicate a symbol that can be used for data transmission, a symbol that needs to be silent, and the like in a corresponding slot. This is not limited in this application.

Operation 403: The terminal device determines the transmission time unit pattern based on the information about the transmission time unit pattern.

In an example, the information about the transmission time unit pattern may be description information of the transmission time unit pattern. For example, if the transmission time unit pattern is the pattern a, the description information is information describing the following: In a slot corresponding to the transmission time unit pattern, third and fourth symbols are a transmission time unit, and sixth and seventh symbols are a transmission time unit. If the transmission time unit pattern is the pattern 1, the description information is information describing the following: In a corresponding slot, first and second symbols are a transmission time unit 0, third and fourth symbols are a transmission time unit 1, a fifth symbol is a transmission time unit 2, and sixth and seventh symbols are a transmission time unit 3.

In one embodiment, the information about the transmission time unit pattern may be an identifier of the transmission time unit pattern. For example, before sending the notification message to the terminal device, the network side device may send each transmission time unit pattern and an identifier of the transmission time unit pattern that are preconfigured in the network side device to the terminal device, so that the terminal device stores a correspondence between each transmission time unit pattern and the identifier of the transmission time unit pattern. Therefore, after determining a transmission time unit pattern that needs to be used for data transmission between the network side device and the terminal device, the network side device may indicate the transmission time unit pattern by using an identifier of the transmission time unit pattern.

Further, when the network side device determines the N transmission time unit patterns respectively corresponding to the N slot sets, and adds information about the N slot sets and information about the N transmission time unit patterns to the notification message, the terminal device may determine the N transmission time unit patterns based on the information about the N transmission time unit patterns.

Operation 404: The terminal device determines a transmission time unit in the slot based on the transmission time unit pattern.

It may be understood that when the terminal device determines the N transmission time unit patterns, the N transmission time unit patterns are in a one-to-one correspondence with the N slot sets, and therefore the terminal device may determine, based on each of the N transmission time unit patterns, a transmission time unit in a slot in a corresponding slot set in the N slot sets.

Operation 405: The terminal device transmits data in the determined transmission time unit.

To be specific, the terminal device sends data to the network side device in the determined transmission time unit, or receives, in the determined transmission time unit, data sent by the network side device.

In one embodiment, when the network side device needs to send downlink data with a relatively large data volume to the terminal device, the network side device may need to aggregate a plurality of transmission time units into one time unit for data transmission. For example, the notification message in operation 402 may further include instruction information used to instruct the terminal device to transmit data in J aggregated transmission time units. Therefore, in operation 405, the terminal device may aggregate the J transmission time units according to the instruction information, and transmit data in the J aggregated transmission time units according to the instruction information.

The J transmission time units are transmission time units that meet a preset aggregation condition in at least one contiguous slot. The aggregation condition may be information that is corresponding to a transmission time unit pattern corresponding to the at least one slot and that is used to indicate transmission time units that need to be aggregated in the at least one slot.

For example, the information used to indicate the transmission time units that need to be aggregated in the at least one slot is implicit information. In two contiguous slots, it is assumed that the two contiguous slots are an even slot and an odd slot that is contiguous with the even slot, and a combination of transmission time unit pattern corresponding to the two slots is the combination 2. Implicit information corresponding to the combination 2 is that transmission time units identified as 1 and 3 need to be aggregated. In this case, after the terminal device receives the aggregation instruction, when transmitting data on the two contiguous slots, the terminal device may aggregate a transmission time unit 1 and a transmission time unit 3 in the even slot and a transmission time unit 1 and a transmission time unit 3 in the odd slot into one time unit, and transmit data on this time unit.

Alternatively, the aggregation condition may be a threshold value of a quantity of symbols included in a transmission time unit allocated to the terminal device in the at least one contiguous slot. For example, in two contiguous slots, when a total quantity of symbols included in the J transmission time units allocated to the terminal device for data transmission is greater than 12, the terminal device may determine that the J transmission time units in the two contiguous slots may be aggregated into one time unit. For another example, in four contiguous slots, when a total quantity of symbols included in the J transmission time units allocated to the terminal device for data transmission is greater than or equal to 7, the terminal device may determine that the J transmission time units in the four contiguous slots may be aggregated into one time unit.

It should be noted that the aggregation condition may be designed according to a requirement in actual engineering, and this is not limited in this application.

It can be learned from the foregoing embodiments that according to the data transmission method provided in this application, the network side device can instruct, by using the determined transmission time unit pattern, the terminal to transmit data by using some symbols in each slot as a transmission time unit. In other words, the terminal device transmits data on some symbols in each slot instead of in the entire slot. In this case, the network side device may schedule a remaining symbol for another carrier for data transmission, so that a carrier used by the terminal and the another carrier can be deployed overlapping with each other.

The solutions provided in this application are mainly described above from a perspective of interaction between network elements. It may be understood that to implement the foregoing functions, the network elements, such as the network side device and the terminal device, include corresponding hardware structures and/or software modules for performing the functions. A person of ordinary skill in the art should easily be aware that, in combination with the examples described in the embodiments disclosed in this specification, units and algorithms operations may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the network side device and the terminal device may be divided into function modules based on the foregoing method example. For example, each function module may be obtained through division based on each corresponding function, or two or more functions may be integrated into one processing module. The integrated module may be implemented in a form of hardware, or may be implemented in a form of a software function module. It should be noted that division of modules in this application is merely an example, and is only division of logical functions. Other division manners may be available in actual implementations.

Figure 8A:
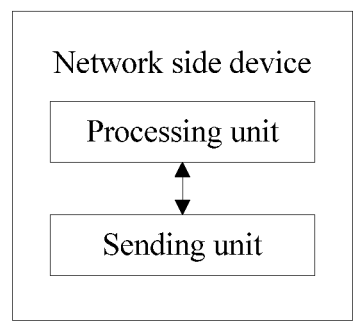
FIG. 8A is a first schematic structural diagram of a network side device according to this application.

When each function module is obtained through division based on each corresponding function, FIG. 8A is a possible schematic structural diagram of the network side device in the foregoing embodiments. The network side device includes a processing unit and a sending unit, in which "unit" may also be known as a "circuit." The processing unit is configured to support the network side device in performing the process 401 in FIG. 4, and the sending unit is configured to support the network side device in performing the process 402 in FIG. 4. All related content of operations in the foregoing method embodiments may be cited in function descriptions of corresponding function modules. Details are not described herein again.

Figure 8B:
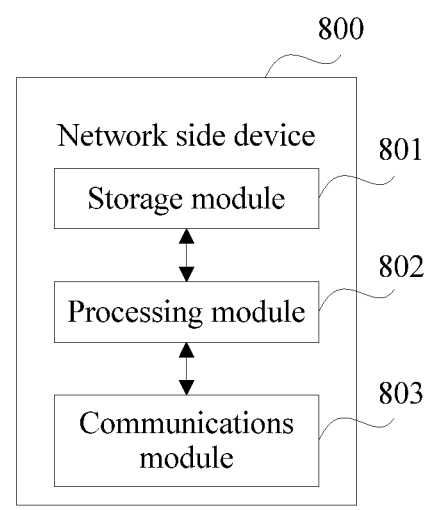
FIG. 8B is a second schematic structural diagram of a network side device according to this application.

When an integrated unit is used, FIG. 8B is a possible schematic structural diagram of the network side device in the foregoing embodiments. The network side device includes a processing module 802 and a communications module 803 in which "module" may also be known as a "circuit." The processing module 802 is configured to control and manage an action of the network side device. For example, the processing module 802 is configured to support the network side device in performing the processes 401 and 402 in FIG. 4, and/or performing another process of the technology described in this specification. The communications module 803 is configured to support the network side device in communicating with another network entity, for example, communicating with the function module or the network entity shown in FIG. 1. The network side device may further include a storage module 801, configured to store program code and data of the network side device.

The processing module 802 may be a processor or a controller, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 803 may be a transceiver, a transceiver circuit, a communications interface, or the like. The storage module 801 may be a memory.

Figure 8C:
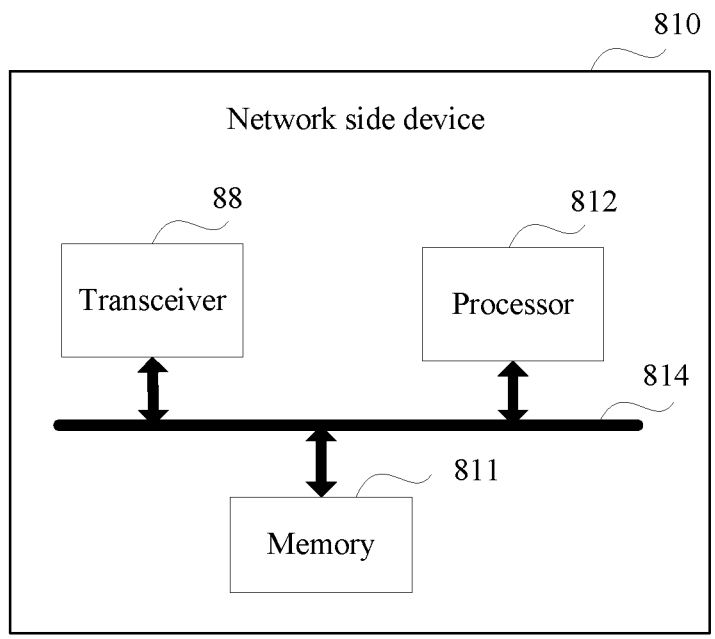
FIG. 8C is a third schematic structural diagram of a network side device according to this application.

When the processing module 802 is a processor, the communications module 803 is a transceiver, and the storage module 801 is a memory, the network side device in this application may be a network side device shown in FIG. 8C.

As shown in FIG. 8C, the network side device includes a processor 812, a transceiver 813, a memory 811, and a bus 814. The transceiver 813, the processor 812, and the memory 811 are connected to each other by using the bus 814. The bus 814 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 8C, but this does not mean that there is only one bus or only one type of bus.

Figure 9A:
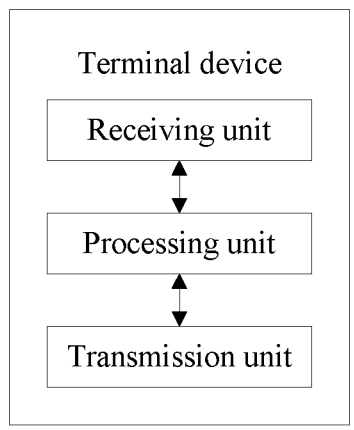
FIG. 9A is a second schematic structural diagram of a network side device according to this application.

When each function module is obtained through division based on each corresponding function, FIG. 9A is a possible schematic structural diagram of the terminal device in the foregoing embodiments. The terminal device includes a sending unit, a processing unit, and a transmission unit, in which "unit" may also be known as a "circuit." The sending unit is configured to support the terminal device in performing the process 403 in FIG. 4, the processing unit is configured to support the terminal device in performing the process 404 in FIG. 4, and the transmission unit is configured to support the terminal device in performing the process 45 in FIG. 4. All related content of operations in the foregoing method embodiments may be cited in function descriptions of corresponding function modules. Details are not described herein again.

Figure 9B:
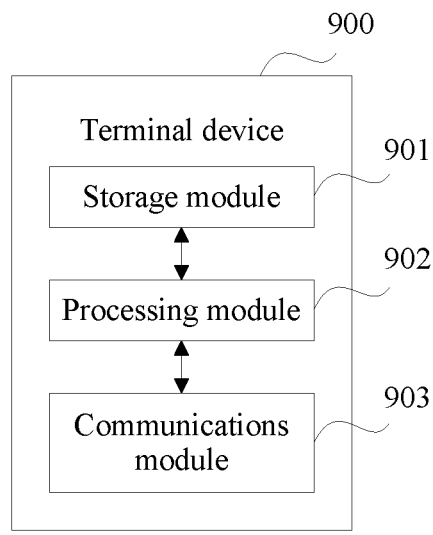
FIG. 9B is a third schematic structural diagram of a network side device according to this application.

When an integrated unit is used, FIG. 9B is a possible schematic structural diagram of the terminal device in the foregoing embodiments. The terminal device includes a processing module 902 and a communications module 903. The processing module 902 is configured to control and manage an action of the terminal device. For example, the processing module 902 is configured to support the terminal device in performing the processes 401 and 402 in FIG. 4, and/or performing another process of the technology described in this specification. The communications module 903 is configured to support the terminal device in communicating with another network entity, for example, communicating with the function module or the network entity shown in FIG. 1. The terminal device may further include a storage module 901, configured to store program code and data of the terminal device.

The processing module 902 may be a processor or a controller, such as a CPU, a general-purpose processor, a DSP, an ASIC, an FPGA or another programmable logic device, a transistor logic device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 903 may be a transceiver, a transceiver circuit, a communications interface, or the like. The storage module 901 may be a memory.

Figure 9C:
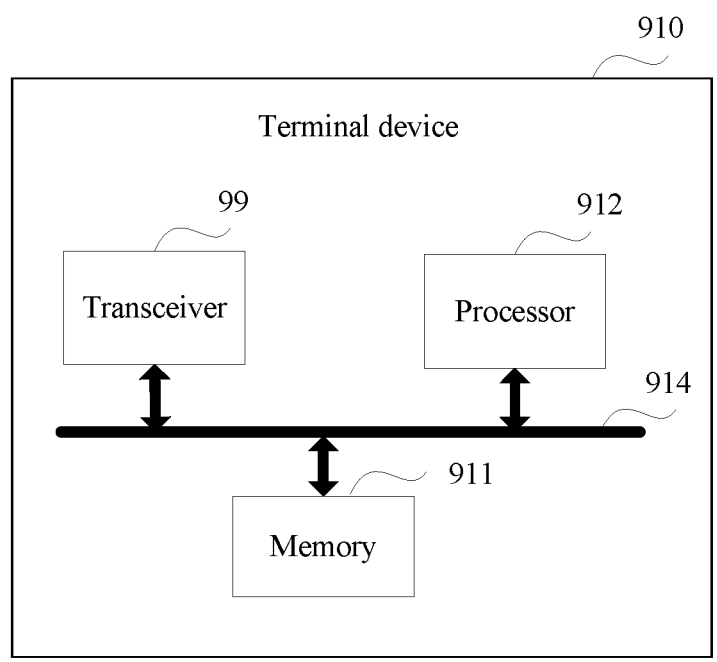
FIG. 9C is a fourth schematic structural diagram of a network side device according to this application.

When the processing module 902 is a processor, the communications module 903 is a transceiver, and the storage module 901 is a memory, the terminal device in this application may be a terminal device shown in FIG. 9C.

As shown in FIG. 9C, the terminal device includes a processor 912, a transceiver 913, a memory 911, and a bus 914. The transceiver 913, the processor 912, and the memory 911 are connected to each other by using the bus 914. The bus 914 may be a PCI bus, an EISA bus, or the like. The bus may be classified into an address bus, a data bus, a control bus, and the like. For ease of representation, only one thick line is used to represent the bus in FIG. 9C, but this does not mean that there is only one bus or only one type of bus.

Method or algorithm operations described in combination with the content disclosed in this application may be implemented by hardware, or may be implemented by a processor by executing a software instruction. The software instruction may include a corresponding software module. The software module may be stored in a random access memory (random access memory, RAM), a flash memory, a read-only memory (read only memory, ROM), an erasable programmable read only memory (erasable programmable ROM, EPROM), an electrically erasable programmable read only memory (electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

In specific implementation, the present invention further provides a computer storage medium. The computer storage medium may store a program, and when the program is executed, some or all of the operations in the embodiments of the data transmission method provided in the present invention may be performed. The storage medium may be a magnetic disk, an optical disc, a read-only memory (read-only memory, ROM), a random access memory (random access memory, RAM), or the like.

As shown in FIG. 1, this application further provides a communications system that includes the network side device shown in FIG. 8A, 8B, or 8C, and the terminal device shown in FIG. 9A, 9B, or 9C.

A person skilled in the art may clearly understand that the technologies in this application may be implemented by software in addition to a necessary general hardware platform. Based on such an understanding, the technical solutions of this application essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, a network device, or the like) to perform the methods described in the embodiments or in some parts of the embodiments of the present invention.

For same or similar parts in the embodiments in this specification, mutual reference may be made between these embodiments. Especially, the apparatus embodiment is basically similar to a method embodiment, and therefore is described briefly. For related parts, refer to descriptions in the method embodiment.

The foregoing descriptions are implementations of the present invention, but are not intended to limit the protection scope of the present invention.

What is claimed is:

1. A data transmission method, comprising:
    receiving, at a terminal device, a notification message from a network side device, wherein the notification message comprises information about a slot set, information about a transmission time unit pattern, and a transmission time unit identifier, wherein the information about the transmission time unit indicates the transmission time unit pattern corresponding to the slot set, wherein the transmission time unit pattern indicates a symbol location at which a transmission time unit in a slot in the slot set is located, wherein a quantity of symbols comprised in the transmission time unit is less than a quantity of symbols comprised in the slot in the slot set, wherein the transmission time unit identifier indicates a transmission time unit to be used by the terminal device to transmit data in the slot in the slot set, wherein the slot comprises M transmission time units, M being an integer greater than 1, wherein a total quantity of symbols comprised in the M transmission time units is equal to a quantity of symbols comprised in the slot, and wherein the transmission time unit pattern is one of the following six patterns:
    a pattern 1 indicating that in the slot, first and second symbols are a transmission time unit, third and fourth symbols are a transmission time unit, a fifth symbol is a transmission time unit, and sixth and seventh symbols are a transmission time unit,
    a pattern 2 indicating that in the slot, a first symbol is a transmission time unit, second to fourth symbols are a transmission time unit, a fifth symbol is a transmission time unit, and sixth and seventh symbols are a transmission time unit,
    a pattern 3 indicating that in the slot, first to third symbols are a transmission time unit, a fourth symbol is a transmission time unit, a fifth symbol is a transmission time unit, and sixth and seventh symbols are a transmission time unit,
    a pattern 4 indicating that in the slow, first to fifth symbols are a transmission time unit, and sixth and seventh symbols are a transmission time unit,
    a pattern 5 indicating that in the slot, a first symbol is a transmission time unit, and second to seventh symbols are a transmission time unit, or
    a pattern 6 indicating that in the slot, first and second symbols are a transmission time unit, and third to seventh symbols are a transmission time unit;
    determining the transmission time unit in the slot in the slot set based on the information about the transmission time unit pattern and the transmission time unit identifier; and
    transmitting data in the determined transmission time unit.

2. The method according to claim 1, wherein a quantity of pieces of information about the transmission time unit pattern and a quantity of slot sets are both N, N≥2, and N is an integer; and
    the determining the transmission time unit in the slot based on the information about the transmission time unit pattern comprises:
    determining the transmission time unit in a slot in a corresponding slot set in the N slot sets based on each of the N pieces of information about the transmission time unit pattern.

3. The method according to claim 1, wherein the notification message further comprises instruction information used to instruct to transmit data in J aggregated transmission time units, J≥2, J is an integer, and the J transmission time units are transmission time units that meet a preset aggregation condition in at least one contiguous slot; and
    the transmitting data in the determined transmission time unit comprises:
    aggregating the J transmission time units according to the instruction information, and transmitting data in the J aggregated transmission time units according to the instruction information.

4. The method according to claim 3, wherein the preset aggregation condition is information that is corresponding to a transmission time unit pattern corresponding to the at least one slot and that indicates transmission time units that need to be aggregated in the at least one slot.

5. A terminal device, comprising:
    a receiving unit to receive a notification message from a network side device, wherein the notification message comprises information about a slot set, information about a transmission time unit pattern, and a transmission time unit identifier, wherein the information about the transmission time unit pattern indicates the transmission time unit pattern corresponding to the slot set, wherein the transmission time unit pattern indicates a symbol location at which a transmission time unit in a slot in the slot set is located, wherein a quantity of symbols comprised in the transmission time unit is less than a quantity of symbols comprised in the slot set, and wherein the transmission time unit identifier indicates a transmission time unit to be used by the terminal device to transmit data in the slot in the slot set, wherein the slot comprises M transmission time units, M being an integer greater than 1, wherein a total quantity of symbols comprised in the M transmission time units is equal to a quantity of symbols comprised in the slot, and wherein the transmission time unit pattern is one of the following six patterns:
    a pattern 1 indicating that in the slot, first and second symbols are a transmission time unit, third and fourth symbols are a transmission time unit, a fifth symbol is a transmission time unit, and sixth and seventh symbols are a transmission time unit,
    a pattern 2 indicating that in the slot, a first symbol is a transmission time unit, second to fourth symbols are a transmission time unit, a fifth symbol is a transmission time unit, and sixth and seventh symbols are a transmission time unit,
a pattern 3 indicating that in the slot, first to third symbols are a transmission time unit, a fourth symbol is a transmission time unit, a fifth symbol is a transmission time unit, and sixth and seventh symbols are a transmission time unit,
a pattern 4 indicating that in the slow, first to fifth symbols are a transmission time unit, and sixth and seventh symbols are a transmission time unit,
a pattern 5 indicating that in the slot, a first symbol is a transmission time unit, and second to seventh symbols are a transmission time unit, or
a pattern 6 indicating that in the slot, first and second symbols are a transmission time unit, and third to seventh symbols are a transmission time unit;
a processing unit to determine the transmission time unit in the slot in the slot set based on the information about the transmission time unit pattern and the transmission time unit identifier; and
a transmission unit, configured to transmit data in the determined transmission time unit.

6. The terminal device according to claim 5, wherein a quantity of pieces of information about the transmission time unit pattern and a quantity of slot sets are both N, N≥1, and N is an integer; and
the processing unit is further configured to determine the transmission time unit in a slot in a corresponding slot set in the N slot sets based on each of the N pieces of information about the transmission time unit pattern.

7. The terminal device according to claim 5, wherein the notification message received by the receiving unit further comprises instruction information used to instruct to transmit data in J aggregated transmission time units J≥2, J is an integer, and the J transmission time units are transmission time units that meet a preset aggregation condition in at least one contiguous slot; and
the transmission unit is further configured to: aggregate the J transmission time units according to the instruction information, and transmit data in the J aggregated transmission time units according to the instruction information.

8. The terminal device according to claim 7, wherein the preset aggregation condition is information that is corresponding to a transmission time unit pattern corresponding to the at least one slot and that indicates transmission time units that need to be aggregated in the at least one slot.

9. A communications system, comprising:
a network side device including:
a processing unit to determine a transmission time unit pattern corresponding to a slot set, wherein the transmission time unit pattern indicates a symbol location at which a transmission time unit in a slot in the slot set is located, and wherein a quantity of symbols comprised in the transmission time unit is less than a quantity of symbols comprised in the slot in the slot set; and
a sending unit to send a notification message to a terminal device, wherein the notification message comprises information about the slot set, information about the transmission time unit pattern, and a transmission time unit identifier, wherein the information about the transmission time unit pattern indicates the transmission time unit pattern, and wherein the transmission time unit identifier indicates a transmission time unit to be used by the terminal device to transmit date in the slot in the slot set, wherein the slot comprises M transmission time units, M being an integer greater than 1, wherein a total quantity of symbols comprised in the M transmission time units is equal to a quantity of symbols comprised in the slot, and wherein the transmission time unit pattern is one of the following six patterns:
a pattern 1 indicating that in the slot, first and second symbols are a transmission time unit, third and fourth symbols are a transmission time unit, a fifth symbol is a transmission time unit, and sixth and seventh symbols are a transmission time unit,
a pattern 2 indicating that in the slot, a first symbol is a transmission time unit, second to fourth symbols are a transmission time unit, a fifth symbol is a transmission time unit, and sixth and seventh symbols are a transmission time unit,
a pattern 3 indicating that in the slot, first to third symbols are a transmission time unit, a fourth symbol is a transmission time unit, a fifth symbol is a transmission time unit, and sixth and seventh symbols are a transmission time unit,
a pattern 4 indicating that in the slot, first to fifth symbols are a transmission time unit, and sixth and seventh symbols are a transmission time unit,
a pattern 5 indicating that in the slot, a first symbol is a transmission time unit, and second to seventh symbols are a transmission time unit, or
a pattern 6 indicating that in the slot, first and second symbols are a transmission time unit, and third to seventh symbols are a transmission time unit; and
a terminal device including:
a receiving unit to receive the notification message sent by the network side device;
a processing unit to determine the transmission time unit in the slot in the slot set based on the information about the transmission time unit pattern and the transmission time unit identifier; and
a transmission unit to transmit data in the determined transmission time unit.

10. The communication system of claim 9, wherein the processing unit of the network side device is further configured to determine, based on a symbol occupation status of a first carrier in the slot, the transmission time unit pattern corresponding to the slot set, wherein the first carrier is a carrier that is deployed overlapping with a carrier used by the terminal device.

11. The communication system of claim 9, wherein a quantity of transmission time unit patterns determined by the processing unit of the network side device and a quantity of slot sets are both N, N≥1, N is an integer, and the notification message sent by the sending unit comprises information about the N slot sets and information about the N transmission time unit patterns.

12. The communication system of claim 9, wherein the notification message sent by the sending unit further comprises instruction information used to instruct the terminal device to transmit data in J aggregated transmission time units, J≥2, J is an integer, and the J transmission time units are transmission time units that meet a preset aggregation condition in at least one contiguous slot.

13. The communication system of claim 12, wherein the preset aggregation condition is information that is corresponding to a transmission time unit pattern corresponding to the at least one slot and that indicates transmission time units that need to be aggregated in the at least one slot.

\* \* \* \* \*

UNITED STATES PATENT AND TRADEMARK OFFICE
CERTIFICATE OF CORRECTION

PATENT NO.        : 11,076,402 B2
APPLICATION NO.   : 16/460070
DATED             : July 27, 2021
INVENTOR(S)       : Hao Tang, Guohua Zhou and Zhenfei Tang It is certified that error appears in the above-identified patent and that said Letters Patent is hereby corrected as shown below:

In the Claims

In Claim 1, Column 23, Line 31, "time unit indicates" should be --time unit pattern indicates--.

In Claim 1, Column 23, Line 62, "in the slow" should be --in the slot--.

In Claim 5, Column 25, Line 9, "in the slow" should be --in the slot--.

In Claim 9, Column 25, Line 67, "transmit date in the slot" should be --transmit data in the slot--.

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*